Feb. 10, 1953   H. I. JOHNSON   2,628,044
CONTROL MECHANISM FOR AIRCRAFT SURFACES
Filed July 25, 1946   2 SHEETS—SHEET 1

Inventor
Harold I. Johnson
By M. A. Hayes
Attorney

Feb. 10, 1953 H. I. JOHNSON 2,628,044
CONTROL MECHANISM FOR AIRCRAFT SURFACES
Filed July 25, 1946 2 SHEETS—SHEET 2

INVENTOR
HAROLD I. JOHNSON

By M. C. Hayes

ATTORNEY

Patented Feb. 10, 1953

2,628,044

UNITED STATES PATENT OFFICE 2,628,044

CONTROL MECHANISM FOR AIRCRAFT SURFACES

Harold I. Johnson, Hampton, Va.

Application July 25, 1946, Serial No. 686,094

8 Claims. (Cl. 244—75)

(Granted under Title 35, U. S. Code (1952), sec. 266)

The present invention relates to new and useful improvements in aircraft controls, and more particularly to improvements in the mechanism for operating the flight control surfaces of airplanes.

Efforts have been made and are being made to develop elevator control surfaces having large amounts of aerodynamic balance so as to provide desirable stick forces over a wide range of center of gravity positions. In order to arrange steady stick-force gradients to desirable values over a large center of gravity range, it is necessary to use large amounts of some type of aerodynamic balance as a means of obtaining a relatively small restoring tendency. The use of such elevators has been limited because it has been found that such elevators offer undesirable feel characteristics during rapid maneuvers. Accordingly, one of the principal objects of the present invention is to provide means for improving the undesirable control feel characteristics of highly balanced elevators so as to permit a wider application and use thereof.

Other undesirable elevator control characteristics are also present in the use of highly balanced elevators. For instance, the relatively small restoring tendency reduces the stick force required during rapid maneuvers and when such stick forces become too light the airplane becomes difficult to maneuver precisely. With the controls free, unstable short period longitudinal oscillations may develop as a result of the small restoring tendency of the elevator controls. The floating tendency may be intentionally made positive in order to increase the value of the steady-stick force gradient, but this loading may develop undesirable variation of the stick force with time during entry into accelerated maneuvers.

With the foregoing in mind, the invention further aims to provide a device which tends to maintain the elevator control centered in its trimmed position and which operates to increase the restoring tendency of the control system so as to overcome the tendency toward short period oscillations with free controls.

The invention still further aims to provide a mechanism which is in the form of a combined spring and fluid damper, both of which cooperate to afford the desired results during operation of the control system.

The above and other objects of the invention will in part be obvious and will be hereinafter more fully pointed out.

Figure 1:
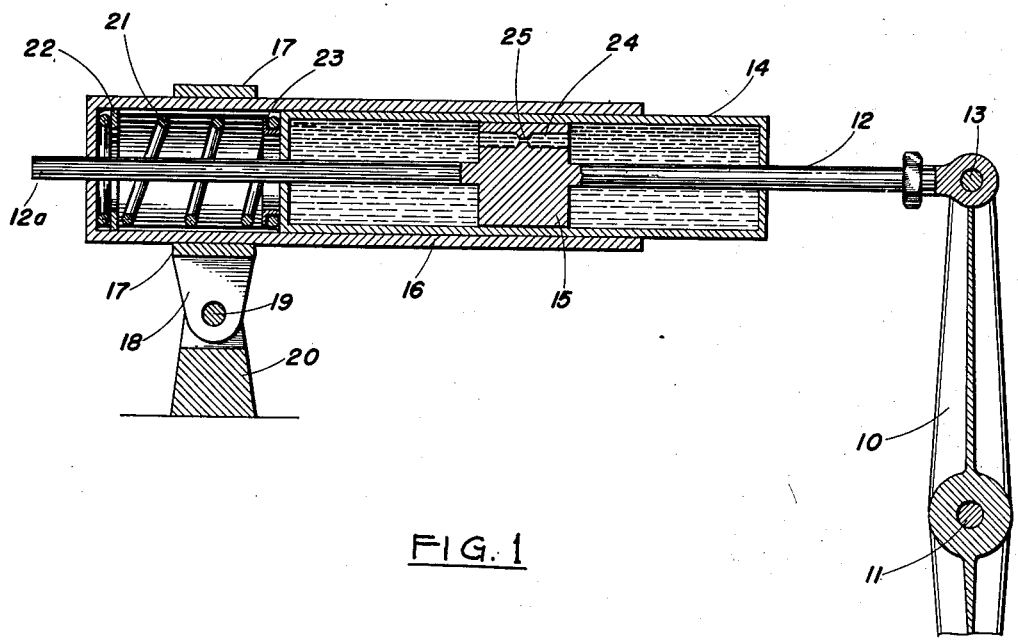
Figure 1 is a longitudinal section through the damping mechanism.

Referring to the accompanying drawing, the bellcrank lever 10 of the elevator control system is shown as being pivoted, as at 11, to a fixed part of the airplane frame of the like. The damping mechanism for improving the feel characteristics is illustrated as being connected to the bellcrank lever, but it is to be clearly understood that the mechanism may be directly connected to the elevator control stick in the pilot's cockpit, if so desired.

A piston rod 12, constituting an aircraft control surface actuating element, is pivotally connected, as at 13, to the end of one arm of the bellcrank lever 10. The piston rod extends into a closed cylinder 14 which is filled with a suitable damping liquid. The inner end of the piston rod 12 is formed with or connected to a piston 15. The entire cylinder 14 is mounted for limited sliding movement within and relative to a tubular sleeve portion 16 which is suitably secured adjacent one end thereof to annular securing bracket 17. The bracket 17 is provided with extensions 18 which are pivotally connected by means of a pivot pin 19 to a supporting member 20 carried by the airplane frame structure or other fixed part. The pivot connections 13, 19 accommodate movement of the assembly during manipulation of the controls.

Between the inner end of the cylinder 14 and the closed end of the tubular sleeve 16, a coil spring 21 is disposed. One end of the spring is fixed in position between the closed end of the sleeve and annulus 22 which may be welded or otherwise suitably secured to the sleeve. The opposite end of the spring 21 is secured between the inner end of the cylinder 14 and a circular retaining member 23 which is L-shaped in cross-section and which is welded or otherwise suitably secured to the adjacent end of the cylinder 14. As illustrated, the piston 15 is also provided with a piston rod extension 12a which extends outwardly of the cylinder 14 and the tubular sleeve 16 in axial alignment with the piston rod 12. The piston 15 is provided with a passage 24 extending longitudinally therethrough and this passage is provided with a restricted orifice 25 substantially at the center thereof. The liquid within the cylinder 14 and on opposite sides of the piston 15 may thus move from one side to the other through the restricted orifice.

In operation of the elevator control surfaces, and particularly during rapid maneuvers, the relative incompressibility of the liquid in the cylinder 14 will serve to prevent any substantial movement of the piston 15 relative to the cylinder 14.

Thus, a sudden pull or push transmitted through the control stick or lever 10 to the piston rod 12 will tend to initially move the entire piston and cylinder arrangement against the action of the spring 21 so that during such rapid movements the cylinder acts as a part of the piston rod connection. The spring will be extended or contracted depending upon the rapid movement of the elevator control stick in one direction or the other, and will supply a resisting force in proportion to the amount of deflection of the control stick. Thus, the spring forces added to the restoring tendency of the elevator can be increased during rapid maneuvers to an amount consistent with that which is necessary for desirable feel characteristics. After the stick has been rapidly shifted and if held in its new position, the fluid in the cylinder 14 will gradually flow through the orifice 25 from one side of the piston 15 to the other under the differential pressure caused by the spring loading on the cylinder. Thus, when the liquid has completed its flow the cylinder 14 will have been moved relative to the piston 15 so that ultimately the spring 21 will not be stressed either in compression or tension.

Figure 2:
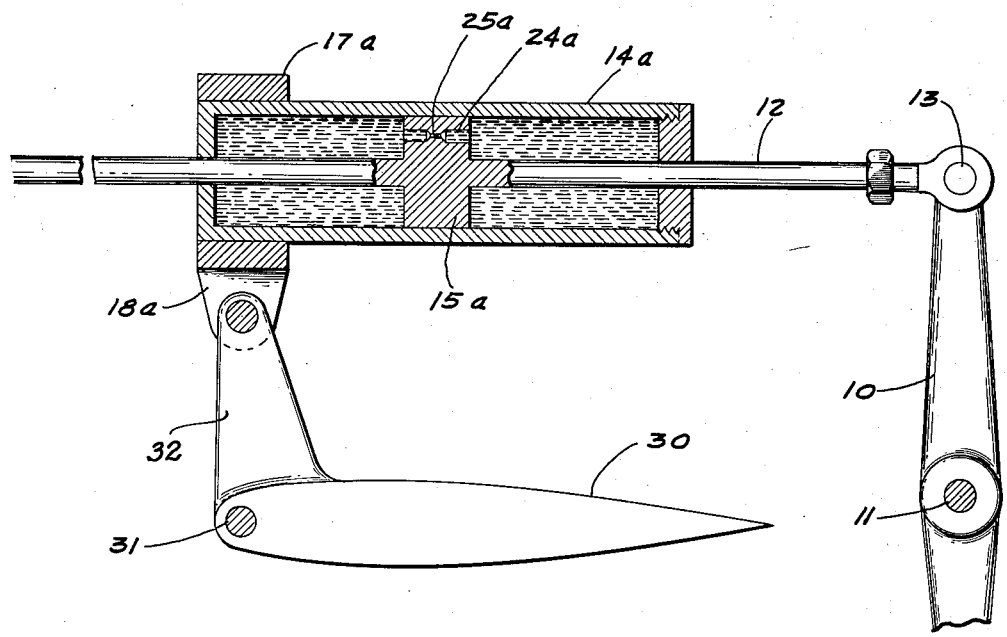
Figure 2 is a similar view but showing a modification.

In Figure 2, the modification consists in replacing the spring restraining means by an auxiliary flap or airfoil 30 disposed in the air stream and suitably pivoted as at 31 to a fixed part of the aircraft. A horn 32 connects the airfoil 30 to the extensions 18a, on the collar 17a, which is secured to the cylinder 14a. The piston 15a operates in the cylinder with damping effects in the manner previously pointed out.

In steady flight the airfoil or flap used with the control mechanism would float in the air stream at the angle for zero hinge moment about its mounting axis regardless of position of the elevator control. This is true because the closed hydraulic cylinder filled with an incompressible fluid and supplied with a piston having an orifice through it, is incapable of resisting steady applied forces; the piston would move with respect to the enclosing cylinder until the pressures on both sides of the piston are substantial equal. Therefore, it is seen that the improved control mechanism, just as above described, would have no effect on the steady flight longitudinal control characteristics of an airplane. If the elevator control is rapidly deflected, however, substantially no relative movement between the piston and enclosing cylinder would occur immediately because of the restriction to fluid flow provided by the orifice in the passageway through the piston. Hence, the airfoil or flap used with the control mechanism would be forcibly deflected and would resist this deflection with a hinge moment proportional to the magnitude of the deflection, the amount of aerodynamic unbalance provided in the airfoil, and the square of the airspeed. In this manner the improved control mechanism would supply the increased force to deflect the elevator control rapidly which is required to make satisfactory the control-feel characteristics of aerodynamically highly balanced elevator control systems. If the elevators were rapidly deflected and then held in the new position, the additional control force arising from the control mechanism would be dissipated gradually through movement of the piston with respect to the cylinder, thus allowing the airfoil or flap of the mechanism to assume the free-floating angle again.

The control mechanism incorporating an aerodynamic surface as the restraint can be used to correct another type of undesirable elevator control-feel characteristic which the spring-type control mechanism is incapable of affecting. This other type of undesirable elevator control-feel characteristic is stick-bouncing or "hunting" tendencies of the elevator control which may occur in flying through rough air. In order to provide desirable control stick forces under steady flight conditions, it is sometimes necessary to use an elevator having a large floating tendency (large change in hinge moment with change in angle of attack) and/or to incorporate intentional mass unbalance in the elevator control system. Either the large floating tendency or the intentional mass unbalance can produce the undesirable stick-bouncing or elevator "hunting" tendency while flying in rough air because, (1) rapid changes in angle of attack which occur in gusty air produce abrupt large changes in the hinge moment of an elevator having a large floating tendency and these hinge moment changes are, of course, transmitted to the pilot's hand control, and (2) rapid changes in normal acceleration which occur in gusty air cause rapid changes in the elevator control force due to mass unbalance of the elevator control system. By arranging the floating tendency of the flap or airfoil used with the control mechanism in such a manner that the control forces arising from the mechanism due to gusty air oppose the control forces arising from a large elevator floating tendency or from elevator control system mass unbalance, it should be possible to reduce greatly, if not substantially eliminate, stick-bouncing or elevator "hunting" in rough air.

From the foregoing description, it will be seen that the present invention makes it possible to take advantage of the desirable static and steady maneuvering longitudinal stability characteristics inherent in highly balanced elevator controls without undesirable feel characteristics of the controls. Thus, the damping mechanism supplies stick force in proportion to the magnitude of deflection of the elevator controls during rapid movements of the stick so as to add more restoring tendency to the highly balanced elevator control surfaces. By adding the spring force to the aerodynamic restoring tendency produced by the elevator when deflected, the elevator stick forces in rapid maneuvers can be increased to the desired stick amount. However, insofar as steady stick force characteristics are concerned, the device has no substantial effect because the liquid damper allows the added stick force to recede when the control stick is held steady.

While certain forms of the invention have been shown for purposes of illustration, it is to be clearly understood that various changes in the details of the construction and arrangement of parts may be made without departing from the scope of the invention as set forth in the appending claims.

The invention described herein may be manufactured and used by or for the Government of the United States of America for governmental purposes without the payment of any royalties thereon or therefor.

What I claim is:

1. In aircraft having an elevator control lever, the provision of an auxiliary pivoted airfoil located in the air stream, and means connecting said airfoil to said elevator control lever including a liquid filled cylinder having a piston movable therein, said cylinder connected to said airfoil and said piston operatively connected to said control lever, a limited orifice in said piston, said cylinder and piston movable together to pivot said airfoil wth rapid movement of said control lever and movable independently of each other with relatively slow movement of said control lever.

2. In aircraft having an elevator control lever, the provision of an auxiliary pivoted airfoil located in the air stream, and means connecting said airfoil to said elevator control lever including a liquid filled cylinder having a piston movable therein, said cylinder connected to said airfoil and said piston operatively connected to said control lever, a by-pass connecting both ends of said cylinder for restricted liquid flow therethrough, said cylinder and piston movable together to pivot said airfoil with rapid movement of said control lever and movable independently of each other with relatively slow movement of said control lever.

3. Apparatus for increasing the feel characteristics of an elevator control system of an aircraft comprising an auxiliary airfoil pivotally mounted on the aircraft in the airstream, a piston mounted on and forming a part of a control rod in said control system, a cylinder enclosing said piston and movable thereon, said cylinder being filled with fluid on both sides of said piston, an orifice in said piston for restricting passage of said fluid from one side of the piston to the other, and lever means connecting said cylinder with said airfoil for transmitting the resistance to movement of said airfoil in the airstream to said control system.

4. Apparatus for increasing the resistance to movement of an elevator control in the control system of an aircraft as the combined function of the speed of movement of the control and the speed of movement of the aircraft comprising an auxiliary airfoil pivotally mounted on the aircraft in the airstream, a piston with an orifice formed on a control rod in said control system, a cylinder enclosing said piston and movable thereon, means connecting said cylinder with said airfoil for resiliently restraining sudden movement of said control rod in said system.

5. In aircraft having an elevator control lever, the provision of a biasing means fixed at one end to fixed aircraft structure, means connecting the other end of said bias means to said elevator control lever including a liquid filled cylinder having a piston movable therein, said cylinder being connected to said other end of said biasing means and said piston being operatively connected to said control lever, a limited orifice in said piston, said piston and said cylinder being movable together against the opposition of said biasing means with rapid movement of said control lever and said piston being movable independently of said cylinder with relatively slow movement of said control lever.

6. In aircraft having an elevator control lever, the provision of a biasing means fixed at one end to fixed aircraft structure, means connecting the other end of said biasing means to said control lever including a liquid filled cylinder having a piston movable therein, said cylinder being connected to said other end of said biasing means and said piston being operatively connected to said control lever, a by-pass connecting both ends of said cylinder for restricted liquid flow therethrough, said piston and cylinder being movable together against the opposition of said biasing means with rapid movement of said control lever and said piston being movable independently of said cylinder with relatively slow movement of said control lever.

7. In aircraft having an elevator control lever, the provision of a resilient member fixed at one end to fixed aircraft structure, means connecting the other end of said member to said elevator control lever including a liquid filled cylinder having a piston movable therein, said cylinder being connected to said other end of said resilient member and said piston being operatively connected to said control lever, a limited orifice in said piston, said piston and said cylinder being movable together to deform said resilient member with rapid movement of said control lever and said piston being movable independently of said cylinder with relatively slow movement of said control lever.

8. In aircraft having an elevator control lever, the provision of a resilient member fixed at one end to fixed aircraft structure, means connecting the other end of said member to said control lever including a liquid filled cylinder having a piston movable therein, said cylinder being connected to said other end of said resilient member and said piston being operatively connected to said control lever, a by-pass connecting both ends of said cylinder for restricted liquid flow therethrough, said piston and cylinder being movable together to deform said resilient member with rapid movement of said control lever and said piston being movable independently of said cylinder with relatively slow movement of said control lever.

HAROLD I. JOHNSON.

REFERENCES CITED

The following references are of record in the file of this patent:

UNITED STATES PATENTS

| Number | Name | Date |
| --- | --- | --- |
| 1,071,518 | Hand | Aug. 26, 1913 |
| 1,671,081 | Miller | May 22, 1928 |
| 2,201,280 | Yantes | May 21, 1940 |
| 2,323,352 | Pitts | July 6, 1943 |
| 2,402,118 | Ashkenas | June 18, 1946 |

FOREIGN PATENTS

| Number | Country | Date |
| --- | --- | --- |
| 321,851 | Great Britain | Dec. 3, 1928 |
| 377,789 | Italy | Jan. 5, 1940 |
| 422,686 | Great Britain | Jan. 16, 1935 |
| 467,969 | Great Britain | June 18, 1937 |
| 577,445 | France | June 5, 1924 |